3,437,141
MULTISTEP METHOD OF WATERFLOODING
Carl F. Brandner, Peggy M. Dunlap, William R. Foster, and Billy G. Hurd, Dallas, Tex., assignors to Mobil Oil Corporation, a corporation of New York.
Filed Oct. 9, 1967, Ser. No. 673,734
Int. Cl. E21b 43/20
U.S. Cl. 166—273      38 Claims

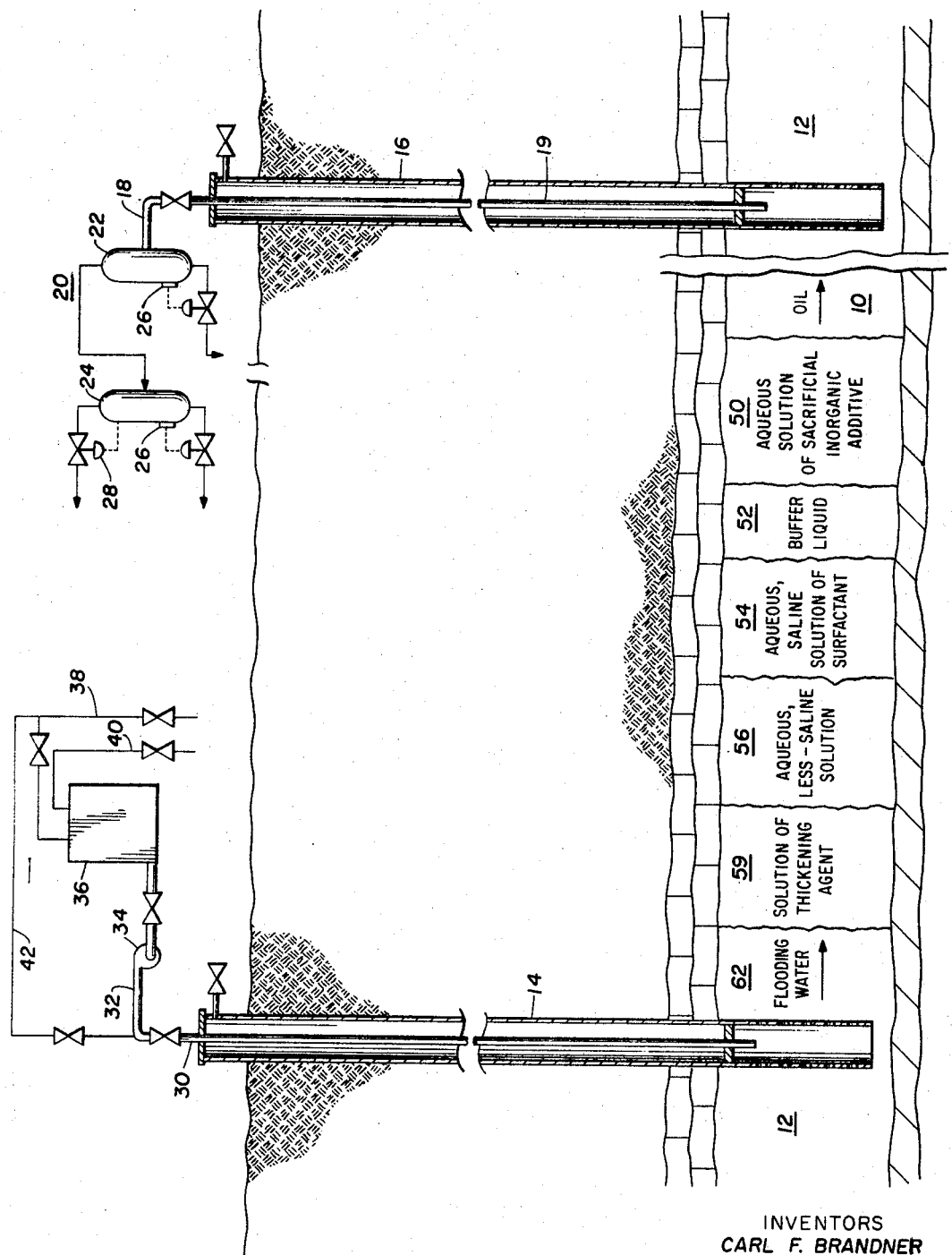

ABSTRACT OF THE DISCLOSURE

This specification discloses an improved method of waterflooding an oil-containing subterranean formation to recover the oil therefrom. Basically, the improved method comprises injecting through injection means and into the subterranean formation, respectively, (a) an aqueous solution of sacrificial inorganic additive to cover the adsorption sites of the formation, (b) optionally a buffer liquid containing a lower concentration of sacrificial inorganic additive to provide an environment chemically compatible with the surfactant solution to follow, (c) an aqueous, saline solution of surfactant having a salinity of from about 1 to about 2 percent by weight, the surfactant having a high molecular weight component and a low molecular weight component, (d) an aqueous, less-saline solution of the low molecular weight component to desorb from the formation high molecular weight component adsorbed from the aqueous, saline solution of surfactant and to create a second bank of surfactant, (e) optionally a solution of thickening agent having decreasing concentrations of thickening agent to form a zone of graded viscosity between the viscosity of the oil and that of the flooding water to be injected therebehind, and (f) flooding water. Oil is produced to the surface of the earth through production means. Step (e) may be carried out when the viscosity of the oil is above that of the water.

Background of the invention

This invention pertains to recovery of petroleum from a subterranean formation. More particularly, this invention pertains to recovery of petroleum contained in a subterranean formation by waterflooding.

The petroleum, more commonly called crude oil or simply oil, accumulated in subterranean formations is recovered or produced therefrom through wells drilled into the subterranean formations. A large amount of the oil is left in the subterranean formations if produced only by primary depletion, i.e., where only initial formation energy is used to recover the oil. Where the initial formation energy is inadequate or has become depleted, supplemental operations are employed. The supplemental operations are often referred to as secondary recovery operations although, in fact, they may be primary or tertiary in sequence of their employment.

In a successful and widely used supplemental operation, a fluid is injected through injection means, comprising one or more injection wells, and passed into the formation. Oil is displaced within and is moved through the formation, and is produced through production means, comprising one or more production wells, as the injected fluid passes from the injection means toward the production means. In a particular operation of this sort, water is employed as the injected fluid and the operation is referred to as a waterflood. The injected water is referred to as the flooding water, as distinguished from the in-situ, or connate, water.

Waterflooding is a useful method of supplementing recovery of oil from subterranean formations. It has, however, a relatively poor microscopic displacement efficiency. The microscopic displacement efficiency may be defined as the ratio of the amount of oil displaced from the pore space of the portion of the formation through which the water has passed to the original amount of oil therein. The relatively poor microscopic displacement is due to the property of immiscibility which the water, as the flooding liquid, has with the oil it seeks to displace within the formation. There is a relatively high interfacial tension between the water and the oil. The interface between the two liquids is an interfacial zone analogous to a film that, because of appreciable interfacial tension, is prevented from moving through the micropores to displace the oil therefrom. Regardless, there is a relationship between the microscopic displacement efficiency of a flooding water and the interfacial tension between the flooding water and the oil it seeks to displace, the displacement efficiency decreasing with increasing interfacial tension.

It has been suggested to employ surfactants to achieve enhanced interfacial activity between the oil and the flooding water. This enhanced interfacial activity decreases the interfacial tension and also alters favorably the contact angle made by the interface between the two liquids with the solid surface of the formation. Employing surfactants is technically successful in that the surfactant solution increases recovery of oil from a subterranean formation. However, the surfactant adsorbs onto the surfaces of the pore spaces of the subterranean formation and the adsorption is so extensive as to render the use of surfactants uneconomical. Stated otherwise, the cost of the surfactant adsorbed onto the subterranean formation is greater than the value of the additional oil recovered by employing the surfactant.

Another major problem in any supplemental recovery operation in which a fluid is injected into a subterranean formation to displace the oil to the production means is premature breakthrough. Premature breakthrough is the breaking through of the driving fluid at the production means before an adequate portion of the formation has been swept. One factor causing premature breakthrough is permeability inhomogeneities. A second factor is the instability effect. The instability effect occurs when the driving fluid has a lower viscosity than the oil. The more pronounced the difference between the viscosity of the oil and the driving fluid, the greater is the instability effect.

Thickeners have been suggested for addition to flooding water to increase its viscosity and lessen the instability effect. The addition of thickeners has been effective but is expensive. Ordinarily, the expense of adding thickeners to the flooding water must be more than compensated by the additional oil produced in order to make their use economically feasible.

SUMMARY OF THE INVENTION

In accordance with the invention, there is provided an improvement in a method of recovering oil from an oil-containing subterranean formation having injection means and production means completed therein, wherein flooding water is injected through the injection means and oil is produced to the surface through the production means. The improvement comprises injecting through the injection means and into the oil-containing subterranean formation: (a) an aqueous solution of sacrificial inorganic additive containing enough sacrificial inorganic additive to cover the majority of the adsorption sites of the subterranean formation, (b) an aqueous, saline surfactant solution containing a surfactant, having a high molecular weight component and a low molecular weight component, in a concentration sufficient to effect an interfacial tension between the aqueous, saline solution of surfactant and the oil of less than about 0.1 dyne per centimeter, and (c) a slug of an aqueous, less-saline solution containing the low molecular weight component of the surfactant. In this way, adsorption of surfactant onto the subterranean formation is minimized, and that which is adsorbed from the aqueous, saline solution of surfactant is desorbed by the aqueous, less-saline solution to form a second bank of surfactant to effect more nearly complete recovery of oil from the formation with a given amount of surfactant. Thereafter, the flooding water is injected into the subterranean formation through the injection means.

When the oil in the formation has a viscosity in excess of the viscosity of the water, it is preferred to inject behind the slug of aqueous, less-saline solution of the low molecular weight component, through the injection means and into the formation, a solution of thickening agent containing an initial concentration of thickening agent sufficient to afford a viscosity in the leading edge of the solution of thickening agent approximating that of the oil, and grading in viscosity, by grading in concentration of the thickening agent, down to approximately the viscosity of the flooding water to be injected therebehind. In this way, instability effects are minimized and premature breakthrough alleviated.

The term "solution," with related verbs, is used herein as inclusive of aqueous dispersions, with similarly related verbs, which behave physically as solutions; for example, which do not deposit a filter cake of the solute on the wall of an injection well or on samples of a subterranean formation.

BRIEF DESCRIPTION OF THE DRAWINGS

The figure illustrates schematically and crosssectionally an embodiment of the invention.

DESCRIPTION OF SPECIFIC EMBODIMENTS

The sacrificial inorganic additive is employed to cover adsorption sites on the surface of the subterranean formation and reduce the adsorption sites available for adsorption of the relatively more expensive surfactant injected into the subterranean formation. Thus, a sacrificial inorganic additive is employed which is more economical than the surfactant and which will successfully compete with the surfactant for the adsorption sites on the subterranean formation. The simplest sacrificial inorganic additive comprises a soluble carbonate or a wetting agent. Suitable soluble carbonates include the alkali metal carbonates. For all practical purposes, sodium carbonate is the soluble carbonate which will be employed. Illustrative wetting agents include the inorganic polyphosphates and borax. The inorganic polyphosphates are those polyphosphates which have high adsorption coefficients and adsorb strongly onto sites of the subterranean formation. Typical are sodium tripolyphosphate, $Na_5P_3O_{10}$, and tetrasodium pyrophosphate, $Na_4P_2O_7$. By borax is meant sodium borate, $Na_2B_4O_7 \cdot 10 \, H_2O$.

In clean formations, i.e., containing predominantly silicates, the soluble carbonate alone is a suitable sacrificial inorganic additive since it will cover essentially all of the adsorption sites. On the other hand, in dirty formations, i.e., containing appreciable quantities of clays, the soluble carbonate alone is not completely satisfactory as the sacrificial inorganic additive despite the fact that it will cover a large number of the adsorption sites. Such dirty formations require the presence of a wetting agent such as an inorganic polyphosphate to cover essentially all of the adsorption sites. A wetting agent alone is a suitable sacrificial inorganic additive. Ordinarily, it is preferred to employ as the sacrificial inorganic additive both sodium carbonate and at least one of the wetting agents since more nearly complete coverage of the adsorption sites can be effected at a much lower cost in this way than by attempting to employ a single additive to cover the adsorption sites.

In carrying out the invention, the aqueous solution of sacrificial inorganic additive is injected through the injection means and into the subterranean formation ahead of the aqueous, saline solution of surfactant. In this way, the sacrificial inorganic additive covers the adsorption sites of the subterranean formation and there are less adsorption sites available on which the relatively more expensive surfactant in the aqueous, saline solution of surfactant can adsorb. It is preferred that the sacrificial inorganic additive be also contained in the aqueous, saline solution of surfactant and in the first 0.1 pore volume of flooding water subsequently injected into the formation. The same concentration of sacrificial inorganic additive, as described hereinafter, is preferably contained in both the aqueous, saline solution of surfactant and the flooding water.

The aqueous solution of sacrificial inorganic additive should contain enough sacrificial inorganic additive to cover an appreciable portion of the adsorption sites of the subterranean formation in order to reduce appreciably the amount of surfactant which will adsorb onto the surfaces of the subterranean formation. However, any quantity will assist in reducing adsorption of the surfactant from the aqueous, saline solution of surfactant. Preferably, the aqueous solution of sacrificial inorganic additives should contain enough sacrificial inorganic additive to cover the majority of the adsorption sites. It is particularly preferred that the solution contain a sufficient quantity of sacrificial inorganic additives to saturate the adsorption sites of the subterranean formation.

Ordinarily, the quantity of sacrificial inorganic additive to be employed is expressed in pounds of additive per acre foot of formation in the pattern which is sought to be swept by the flooding water. A quantity of sacrificial inorganic additive of at least about 400 pounds per acre foot is required. Where the formation is such, because of stratification or otherwise, that the invasion efficiency is less than 100 percent of the pattern sought to be swept by the flooding water, the quantity of the sacrificial inorganic additive is reduced proportionately. Thus, if the invasion efficiency in any formation is 30 percent, i.e., the flooding water will invade only 30 percent of the volume of the formation in the pattern of flow of the flooding water between the injection means and the production means, the quantity of sacrificial inorganic additive will be at least about 120 pounds per acre foot of the total volume of the subterranean formation. Ordinarily, a total amount of sacrificial inorganic additive of from about 1,200 to about 4,000 pounds per acre foot is adequate to saturate the adsorption sites of the subterranean formation. Where the formation is dirty, the larger amounts up to about 4,000 pounds per acre foot of sacrificial inorganic additive are employed.

A convenient empirical expression for the quantity of sacrificial inorganic additives to be employed is the product of the fraction of pore volume of the aqueous solution of sacrificial inorganic additive and the concentration in percent by weight of the sacrificial inorganic additive. A given product of volume and concentartion is equivalent, at a given invasion efficiency, to a given amount in pounds per acre foot. Usually, at least 0.05 (pore volume) (percent by weight), which is roughly equivalent to about 400 pounds per acre foot, of sacrificial inorganic additive is required. Ordinarily, an amount of sacrificial inorganic additive affording from about 0.15 to about 0.5 (pore volume) percent by weight) is adequate. For example, a solution comprising 1 pore volume containing a total of from about 0.15 to about 0.5 percent by weight of sacrificial inorganic additive is adequate. Preferably, the quantity of solution employed will be from about 0.01 to about 0.2 pore volume and the concentration correspondingly higher in order to prevent undue delay in effecting injection of the aqueous solution of sacrificial inorganic additive and, ultimately, in increasing the recovery of oil from the subterranean formation.

Ordinarily, when sodium carboante is employed as a sacrificial inorganic additive, 0.1 pore volume of aqueous solution of sacrificial inorganic additive containing from about 1 to about 3 percent by weight of sodium carbonate will cover the majority of the adsorption sites of a subterranean formation to be flooded. Infrequently, special subterranean formations may require more or less sodium carbonate. For example, since the adsorption sites are predominantly on the edges of clay particles, clean sandstone formations with very little clays may require concentrations of less than 1 percent sodium carbonate in 0.1 pore volume of solution. Conversely, dirty formations may require a concentration above 3 percent in the 0.1 pore volume of solution. Larger volumes containing lower concentrations of sodium carbonate may be employed. Conversely, smaller volumes containing higher concentrations of sodium carboante can be employed.

When a wetting agent is employed as a sacrificial inorganic additive, 0.1 pore volume of aqueous solution of sacrificial inorganic additive containing 0.5 to 2 percent by weight of the wetting agent will cover the majority of the adsorption sites of the formation to be flooded. Similarly, as described in connection with the sodium carbonate, clean sandstone formations may require less wetting agent than the 0.5 percent by weight in the 0.1 pore volume. Conversely, dirty formations may require a larger amount of wetting agent than 2 percent by weight in 0.1 pore volume of solution. Larger volumes containing lower concentrations of wetting agent may be employed. Conversely, smaller volumes containing higher concentrations of wetting agent may be employed.

A preferred aqueous solution of sacrificial inorganic additive comprises about 0.1 pore volume of water containing from about 1 to about 3 percent by weight of sodium carbonate and containing from about 0.5 to about 2 percent by weight of wetting agent.

When the aqueous solution of sacrificial inorganic additive contains a concentration of the sacrificial inorganic additive above about 0.5 percent by weight, as it ordinarily will, an aqueous buffer liquid is employed between the aqueous solution of sacrificial inorganic additive and the aqueous, saline solution of surfactant. The buffer liquid should contain sacrificial inorganic additive to lessen the tendency of the surfactant to adsorb and to establish a chemically compatible environment that enhances the interfacial activity of the surfactant in the aqueous, saline solution of surfactant. The buffer liquid may contain a concentration of from about 0.01 to about 0.5 percent by weight of the sacrificial inorganic additive. Preferably, the buffer liquid will contain from about 0.05 to about 0.2 percent by weight of the sacrificial inorganic additive. The slug of buffer liquid will ordinarily comprise from about 0.01 to about 0.1 pore volume.

Regarding the surfactant, any surfactant can be employed which will, in suitable concentration, reduce the interfacial tension between the solution thereof and the oil phase within the subterranean formation to less than about 0.1 dyne per centimeter and which has a high molecular weight component and a low molecular weight component. Illustrative of suitable surfactants are mixtures of alkyl aryl sulfonates. Preferred surfactants are restricted mixtures of petroleum sulfonates having a median molecular weight of from about 375 to about 430, having molecular weights between 290 and 590, no more than 10 percent by weight having an average molecular weight less than 290, and no more than 15 percent by weight having an average molecular weight greater than 590. Hereinafter, the petroleum sulfonates just described are referred to by the term "the restricted petroleum sulfonates." Particularly preferred surfactants are the restricted petroleum sulfonates having a median molecular weight of from about 400 to about 430 and otherwise having the molecular weight distribution of the restricted petroleum sulfonates outlined above. These particularly preferred petroleum sulfonates are referred to hereinafter as "the preferred restricted petroleum sulfonates."

The molecular weights referred to above and hereinafter in connection with petroleum sulfonates are those of the sodium salts. Moreover, the term "molecular weight" should be understood to mean equivalent weight, which is defined as molecular weight per sulfonate group. The term "molecular weight" is used because it is commonly applied by manufacturers of petroleum sulfonates in describing their products.

The surfactants employed contain a high molecular weight component and a low molecular weight component, as previously indicated. An optimum interfacial tension is effected, and hence a greater displacement of oil within the subterranean formation, by proper mixture of the high molecular weight component and low molecular weight component. For example, petroleum sulfonates having molecular weights as high as 590 and having a median molecular weight of from about 410 to about 450 may be employed as the high molecular weight component. Other petroleum sulfonates having molecular weights as low as 290 and having a median molecular weight of from about 340 to about 380 may be employed as the low molecular weight component.

The aqueous, saline solution of surfactant prior to injection should contain a concentration of surfactant of from about 0.01 to about 25 percent by weight. When the restricted petroleum sulfonates or the preferred restricted petroleum sulfonates are employed as the surfactant, the lowest interfacial tensions are effected by a concentration of surfactant within the formation of from about 0.01 to about 0.5 percent by weight of the surfactant solution.

There is a chromatographic dispersion of surfactant effected by adsorption of the surfactant on the surfaces of the pores of subterranean formations, the higher molecular weight components being adsorbed preferentially to the lower molecular weight components. Accordingly, it is preferred that the aqueous, saline solution of surfactant prior to injection contain a concentration of the higher molecular weight component higher than 0.5 percent by weight to effect the desired concentration of the higher molecular weight component in the aqueous, saline solution of surfactant after injection in a subterranean formation. With petroleum sulfonates, the aqueous, saline solution of surfactant should contain a concentration of from about 1 to about 25 percent by weight of the restricted petroleum sulfonates, or the preferred restricted petroleum sulfonates, or of at least the higher molecular weight portion thereof.

The aqueous, saline solution of surfactant is appreciably more effective in displacing oil within the subterranean formation in an environment of controlled salinity. By "salinity," reference is being made to sodium chloride. To control the salinity environment at near the optimum, the aqeous, saline solution of surfactant should contain from about 1 to about 2 percent by weight of sodium chloride. The presence of sodium chloride in the aqueous, saline solution of surfactant decreases the interfacial tension between the solution and the oil in the formation. On the other hand, a high concentration of sodium chloride is chemically incompatible with the surfactant. Preferably, the aqueous, saline solution of surfactant should not contain in excess of the 2 percent by weight of the sodium chloride. Further, salts having divalent cations, i.e., calcium and magnesium salts, are also chemically incompatible with the surfactant and, preferably, the aqueous, saline solution of surfactant is essentially free of such salts.

The aqueous, saline solution of surfactant may be injected into the formation in the amount of fromt about 0.01 to about 0.2 pore volume. Greater volues may be employed and will recover additional oil. However, the additional oil recovered may have a value less than the cost of employing the greater volumes of the aqueous, saline solution of surfactant.

The slug of aqueous, less-saline solution injected into the formation subsequent to the aqueous, saline solution of surfactant should contain a sufficient concentration of the low molecular weight component of the surfactant to provide an effective surfactant bank when the high molecular weight component is desorbed from the subterranean formation and dissolved therein. A concentration of from about 0.0002 to about 0.03 percent by weight should be employed. In this way, the higher molecular weight component of the surfactant adsorbed from the aqueous, saline solution of surfactant and desorbed into the slug of aqueous, less-saline solution containing the lower molecular weight components will effect a second bank of surfactant comprising a mixture of the higher and lower molecular weight components to achieve efficient recovery of oil from within the subterranean formation.

The effectiveness of the slug of aqueous, less-saline solution, from the standpoint of desorbing the surfactant adsorbed onto the surface of the pores of the formation, is dependent primarily upon its content of sodium chloride. With a lower content of sodium chloride, i.e., with the solution being less-saline, the effectiveness of the solution for desorbing surfactant is increased. The slug of aqueous, less-saline solution should have a content of sodium chloride which is less than about 50 percent of that of the aqueous, saline solution of surfactant. Preferably, the sodium chloride content of the aqueous, less-saline solution should be lower. Thus, the sodium chloride content of the aqueous, less-saline solution may be as low as 10 to 20 percent of that of the aqueous, saline solution of surfactant. Further, the aqueous, less-saline solution is preferably free of salts having divalent cations since these, as mentioned in connection with the aqueous, saline solution of surfactant, are chemically incompatible with the surfactant. In situations where it can be employed, the aqueous, less-saline solution is prepared using fresh water, i.e., has a salt content not in excess of that of potable water.

The slug of aqueous, less-saline solution containing the lower molecular weight component of the surfactant should also contain a sufficient amount of sacrificial inorganic additive to compete with the surfactant for the adsorption sites and reduce the adsorption of the surfactant. Specificially, the slug of aqueous, less-saline solution should contain a concentration of from about 0.05 to about 0.2 percent by weight of sacrificial inorganic additive.

The slug of aqueous, less-saline solution is injected into the formation in the amount of from about 0.05 to about 0.2 pore volume. Ordinarily, an amount of from about 0.1 to about 0.2 pore volume will be employed.

As indicated, when the viscosity of the oil in the subterranean formation is above that of the flooding water, a solution of thickening agent is employed to mitigate instability and premature breakthrough. The initial portion of the solution of thickening agent injected into the subterranean formation contains a concentration of thickening agent sufficient to increase the viscosity of the flooding water to approximately that of the oil. Where the oil in the formation is a light oil, a concentration as low as 0.005 percent by weight of the thickening agent may be sufficient. Ordinarily, a concentration of from about 0.01 to about 0.3 percent by weight is employed. A preferred concentration range for most subterranean formations is from about 0.03 to about 0.1 percent by weight. In rare instances in which it is desired to match viscosity with highly viscous oil or to plug partially an extremely permeable stratum, it may be desirable to employ as high as 2 percent by weight, or more, of the thickening agent in the solution.

The portion of the solution of thickening agent injected into the formation subsequent to the initial portion will contain lower concentrations of the thickening agent to achieve a graded viscosity between that of the oil and that of the flooding water and these concentrations may be linearly decreasing concentrations. For example, if the gradation is to be accomplished in two steps, a second portion of thickening agent would be injected after the initial portion and it would contain about one-half the concentration of thickening agent contained in the initial portion. Similarly, if the gradation is to be accomplished in three steps, two portions of the solution of thickening agent containing two-thirds and one-third, respectively, the concentration of the thickening agent would be injected into the formation following the initial portion. The various portions of the thickening agent containing different concentrations of thickening agent may be considered as being separate and distinct solutions. Further, the viscosity of a solution or portion of solution of thickening agent injected into the formation following the first solution or first portion of solution will be intermediate to that of the oil and the flooding water but need not be any specific fraction of the viscosity of the first solution or first portion of solution.

The solution of thickening agent is injected into the formation in the amount of between about 0.01 and 0.2 pore volume.

Any thickening agent which is compatible with the flooding water and with the surfactants may be employed. Many such thickening agents are known and include such diverse compositions as the natural gums, the water-soluble cellulose compounds such as carboxymethylcellulose and carboxymethylhydroxyethylcellulose, polymeric thickening agents such as the polyvinyl toluene sulfonates, and the partially hydrolyzed polyacrylamides. Particularly suitable thickening agents include the heteropolysaccharides prepared by employing bacteria of the genus Xanthomonas. Of these heteropolysaccharides, the polysaccharide B–1459 is preferred. Polysaccharide B–1459 contains d-glucose, d-mannose, and d-glucuronic acid groups in the ratio 2.8:3.0:2.0. It also contains from about 3 to about 3.5 percent by weight pyruvic acid and about 4.7 percent by weight of acetic acid. The acetic acid exists as the o-acetyl ester, whereas the pyruvic acid is attached through a ketal linkage. The polysaccharide B–1459 is produced by culturing bacterium Xanthomonas campestris NRRL B–1459, United States Department of Agriculture, on a well-aerated medium having a pH of about 7 and containing commercial glucose, organic nitrogen sources, dipotassium hydrogen phosphate, and appropriate trace elements. The preferred fermentation temperature during the culturing is about 28° C. The fermentation reaction is complete in about 96 hours or less. Bacterial cells and suspended impurities are removed from the fermentation product by centrifugation after adjusting the pH to from 5 to 6. The polysaccharide B–1459 is precipitated from the centrifuged fermentation product by adding salt and a low molecular weight alcohol thereto.

The polysaccharide B–1459 is a relatively standard product. Its molecular weight is estimated to be in the millions, judging from the fact that a 1 percent by weight aqueous solution of the polymer has a viscosity of 3,000 centipoises when measured at 25° C. on a Brookfield LVT Viscometer at 30 revolutions per minute.

A suitable polysaccharide B–1459 is commercially avilable under the trade name "Kelzan" from the Kelco Company, San Diego, Calif. 92123.

The polysaccharide B–1459 is subject to bacterial decomposition after a time. Consequently, the solution containing the polysaccharide B–1459 loses some of its high viscosity after a period of time in the formation. This bacterial decomposition is mitigated by adding a bactericide, commonly called a preservative, to the solution containing the polysaccharide B–1459. The preferred bactericide is formaldehyde. The alkali metal chlorinated phenols, such as sodium pentachlorophenol, may also be employed as the bactericide. The bactericide may be employed in the amount of at least 0.0002 percent by weight of the solution of thickening agent. Ordinarily, it is not economically advantageous to employ more than about 0.5 percent by weight of bactericide in the solution of thickening agent.

As a final step, flooding water is injected into the subterranean formation. Injection of the flooding water completes a cycle. Occasionally, it may be desirable to employ more than one cycle. Any additional cycle or cycles may involve all or a lesser number of the steps of the first cycle.

Often, subterranean formations contain brines of high salinity and have an appreciable concentration of divalent cations, principally calcium and magnesium ions. The sacrificial inorganic additives, and the surfactants as previously mentioned, are often chemically incompatible with brines of high salinity and containing appreciable concentration of divalent cations. Further, the surfactants are chemically incompatible with brines having sodium chloride concentrations in excess of about 2 percent by weight, also as previously mentioned, regardless of the concentration of divalent cations.

To prevent any adverse reactions between either the aqueous solution of sacrificial inorganic additive or the aqueous, saline solution of surfactant and the brines within the subterranean formation, water in the amount of about 0.01 to about 0.2 pore volume, inclusive, and having a salinity less than 2.0 percent by weight of sodium chloride and containing essentially no divalent cations, is injected into the subterranean formation ahead of the aqueous solution of sacrificial inorganic additive. This water miscibly displaces the brine, leaving an environment with which the aqueous solution of sacrificial inorganic additive is chemically compatible. Further, it leaves an environment with which the surfactant is chemically compatible.

In cases where the flooding water which is to be injected behind the slug of aqueous, less-saline solution containing the low molecular weight component of the surfactant is concentrated brine or contains an appreciable concentration of divalent cations, water in the amount of from about 0.01 to about 0.2 pore volume, inclusive, and having a salinity of less than 2.0 percent by weight of sodium chloride and containing essentially no divalent cations, is injected into the subterranean formation behind the aqueous, saline solution of surfactant and in front of the flooding water. This water prevents the concentrated brine comprising the flooding water from intermingling with and producing adverse chemical reactions with the surfactant in the aqueous, less-saline solution containing the low molecular weight component of the surfactant.

The operation of one embodiment of the invention is shown schematically in the figure. Therein, oil 10 is to be recovered from subterranean formation 12. Wells 14 and 16 are completed, respectively, as an injection well and a production well. Suitable surface flow line 18 connects tubing 19 from the production well 16 with production facilities 20. The production facilities 20 may comprise a water knockout 22 and a gas-liquid separator 24. Appropriate liquid level controllers 26, as well as backpressure controller 28, are provided. Infrequently, the water knockout 22 may be an emulsion breaker, commonly called a heater-treater, or equivalent. The various solutions employed are injected through tubing 30 into the subterranean formation 12. The tubing 30 is connected via appropriate surface flow lines 32 to pump 34. The pump 34 may take suction from mixing tank 36 where the solutions are mixed.

Mixing tank 36 may be a battery of tanks providing the necessary mixing and storage facility. For simplicity of illustration, however, the mixing tank 36 is shown as a single tank. The tank is connected with a suitable field source of saline water, i.e., an oil field brine essentially free of salts having divalent cations, through line 38 provided with appropriate valving. The tank is also connected via line 40 to a source of water fresher than the oil field brine. This water has a salinity of 0.07 percent by weight of sodium chloride and is essentially free of salts having divalent cations. The water through line 38 is appropriate for use as the flooding water and, with appropriate valving, may be injected directly through tubing 30 without going through mixing tank 36 and pump 34.

About 0.1 pore volume of an aqueous solution of sacrificial inorganic additive is prepared by mixing the oil field brine with 2.8 percent by weight of sodium carbonate and 1.4 percent by weight of sodium tripolyphosphate. The brine contains about 1.2 percent by weight sodium chloride and a minor amount of other salts, but, as indicated, contains essentially no divalent cations. The aqueous solution of sacrificial inorganic additive is injected through the tubing 30 into formation 12 to form bank 50. The banks in the figure are shown schematically as discrete banks, no attempt being made to show the relative amount of oil or of any solution.

Next, about 0.025 pore volume of buffer liquid is prepared and injected through the tubing 30 into formation 12 to form bank 52. The buffer liquid is prepared by mixing the oil field brine with 0.05 percent by weight of sodium carbonate and 0.1 percent by weight of sodium tripolyphosphate.

Next, about 0.1 pore volume of aqueous, saline solution of surfactant is prepared and injected through tubing 30 into formation 12 to form bank 54. The aqueous, saline solution of surfactant contains 2.4 percent by weight of Alconate 80, 0.002 percent by weight of Pyronate 50, 0.05 percent by weight of sodium carbonate, and 0.1 percent by weight of sodium tripolyphosphate. To prepare this solution, the Alconate 80 and the Pyronate 50 are first dissolved in the water from line 40 to form a concentrated solution thereof, and the concentrated solution is then mixed with sufficient volume of the oil field brine and with the sodium carbonate and the sodium tripolyphosphate to provide the desired concentrations stated above. Alconate 80 is a commercially available product containing 80 percent by weight of a mixture of petroleum sulfonates, these petroleum sulfonates having molecular weights as high as 590 and having a median molecular weight of about 418. The Alconate 80 serves as the high molecular weight component of the surfactant. Pyronate 50 is a commercially available product containing 50 percent by weight of a mixture of petroleum sulfonates, these petroleum sulfonates having molecular weights as low as 290 and having a median molecular weight of about 346. The Pyronate 50 serves as the low molecular weight component of the surfactant.

Next, a slug of about 0.1 pore volume of aqueous, less-saline solution containing the low molecular weight component of the surfactant is prepared and injected through tubing 30 into subterranean formation 12 to form bank 56. The aqueous, less-saline solution is prepared by mixing 1 part of the oil field brine with 3 parts of the fresher water and adding thereto 0.001 percent by weight of Pyronate 50, 0.05 percent by weight of sodium carbonate, and 0.1 percent by weight of sodium tripolyphosphate.

Next, about 0.1 pore volume of a solution of thickening agent is prepared and injected through tubing 30 into formation 12. The solution is prepared by mixing Kelzan and formaldehyde with the fresher water to form a concentrated solution thereof and then mixing it with three volumes of the oil field brine. The final solution contains 0.045 percent by weight of Kelzan and 0.02 percent by weight of formaldehyde. Thereafter, two solutions of thickening agent, each of about 0.1 pore volume and having successively lower viscosity by containing a lesser concentration of Kelzan and containing about 0.02 percent by weight of formaldehyde are injected to form banks of graded viscosity. These solutions are prepared in the same manner as the preceding solution of thickening agent except that successively lower concentrations of Kelzan are employed. The three solutions of thickening agent are illustrated as bank 59.

The oil field brine is injected for the remainder of the waterflooding operation and is illustrated as bank 62. Oil is produced from the formation through tubing 19 to the surface.

As previously indicated, the banks are schematic only. The figure does not show the relative amounts of oil or the injected solutions. From experience with similar flooding operations in laboratory models, it appears likely that oil is banked in two spots. The first bank of oil occurs in the vicinity of the aqueous, saline solution of surfactant where the surfactant solution displaces oil within the formation. Through the first portion of the formation being flooded, this is the most significant bank of oil. However, the aqueous, less-saline solution of the low molecular weight component of the surfactant will desorb the high molecular weight component to build a second bank of surfactant. As the second bank of surfactant moves through the formation, it scavenges any oil not displaced within the formation by the aqueous, saline surfactant solution to form the second bank of oil. Initially, the aqueous, saline solution of surfactant effects almost complete microscopic displacement of oil so the second bank of oil is not initially significant. However, as the aqueous, saline solution of surfactant becomes less effective in the latter portions of the flood, the second bank of oil becomes increasingly more significant. The second bank of oil will be formed in the vicinity of the second bank of surfactant.

Once the oil has been displaced within the formation and started to move through the formation, the solution of thickening agent, when employed, effects a pistonlike displacement which keeps the oil moving by coaction with the preceding surfactant solutions. Furthermore, the solution of thickening agent lessens instability effects and premature breakthrough because the viscosity is graded and the first portion of the solution more nearly matches the viscosity of the oil. Consequently, the displacing liquids within the formation sweep a greater areal portion of the subterranean formation before they break through at the producing well.

Thus, by employing the invention, more oil is recovered from an oil-containing subterranean formation than has been heretofore possible. Moreover, by employing the less expensive sacrificial inorganic additives and the aqueous, less-saline solution following the aqueous, saline solution of surfactant, the adsorption of surfactant is mitigated such that the process becomes economically feasible for recovering a large proportion of oil from a subterranean formation.

Having thus described the invention, it will be understood that such description has been given by way of illustration and example and not by way of limitation. The appended claims define the scope of the invention.

What is claimed is:

1. In a method for recovering oil from an oil-containing subterranean formation having injection means and production means, wherein flooding water is injected through an injection well and oil is produced to the surface through a production well, the improvement comprising injecting through an injection well and into said subterranean formation:
    (a) an aqueous solution of sacrifical inorganic additive containing enough sacrificial inorganic additive to cover a majority of the adsorption sites of said subterranean formation,
    (b) an aqueous, saline surfactant solution containing a surfactant, said surfactant having a high molecular weight component and a low molecular weight component, in a concentration sufficient to effect an interfacial tension between said aqueous, saline solution and said oil of less than 0.1 dyne per centimeter, and
    (c) an aqueous, less-saline solution of said low molecular weight component of said surfactant.

2. The method of claim 1 wherein said sacrificial inorganic additive is a soluble carbonate.

3. The method of claim 2 wherein said soluble carbonate is sodium carbonate.

4. The method of claim 1 wherein said sacrificial inorganic additive is a wetting agent.

5. The method of claim 4 wherein said wetting agent is an inorganic polyphosphate or sodium borate.

6. The method of claim 5 wherein said inorganic polyphosphate is sodium tripolyphosphate or tetrasodium pyrophosphate.

7. The method of claim 1 wherein said sacrificial inorganic additive is both a soluble carbonate and a wetting agent.

8. The method of claim 1 wherein said aqueous solution of sacrificial inorganic additive is in a volume, expressed in fraction of pore volume, and contains a concentration, expressed in percent by weight:
    (a) of sodium carbonate which when multiplied by the volume affords a (volume) (concentration) product of from about 0.1 to about 0.3, and
    (b) of an inorganic polyphosphate or borax which when multiplied by the volume affords a (volume) (concentration) product of from about 0.05 to about 0.2.

9. The method of claim 1 wherein said aqueous solution of sacrificial inorganic additive is in a volume of about 0.1 pore volume and contains from about 1 to about 3 percent by weight of sodium carbonate and from about 0.5 to about 2 percent by weight of a wetting agent.

10. The method of claim 1 wherein about 0.01 to about 0.1 pore volume of an aqueous buffer liquid containing from about 0.01 to about 0.5 percent by weight of sacrificial inorganic additive is injected through said injection well and into said subterranean formation behind said aqueous solution of sacrificial inorganic additive and before said aqueous, saline solution of surfactant.

11. The method of claim 1 wherein said aqueous, saline solution of surfactant contains a concentration of surfactant of from about 0.01 to about 25 percent by weight.

12. The method of claim 1 wherein said aqueous solution of sacrificial inorganic additive is in a volume of about 0.1 pore volume and contains from about 1 to about 3 percent by weight of sodium carbonate and from about 0.5 to about 2 percent by weight of an inorganic polyphosphate or borax, and said aqueous, saline solution of surfactant contains sodium carbonate, an inorganic polyphosphate or borax, from about 0.1 to about 25 percent by weight of surfactant, and from about 1 to about 2 percent by weight of sodium chloride.

13. The method of claim 1 in which said surfactant in said aqueous, saline solution of surfactant is a mixture of petroleum sulfonates having a median molecular weight of from about 375 to about 430, having molecular weights between 290 and 590, no more than 10 percent by weight having an average molecular weight less than 290, and no more than 15 percent by weight having an average molecular weight greater than 590.

14. The method of claim 13 wherein said surfactant is a mixture of petroleum sulfonates having a median molecular weight of from about 400 to about 430, having molecular weights between 290 and 590, no more than 10 percent by weight having an average molecular weight less than 290, and no more than 15 percent by weight having an average molecular weight greater than 590.

15. The method of claim 13 wherein said mixture of petroleum sulfonates consist of high molecular weight petroleum sulfonates having molecular weights as high as 590 and having a median molecular weight of from about 410 to about 450 mixed with low molecular weight petroleum sulfonates having molecular weights as low as 290 and having a median molecular weight of from about 340 to about 380.

16. The method of claim 1 wherein said aqueous, less-saline solution containing said low molecular weight component of said surfactant contains less than 1 percent by weight of sodium chloride.

17. The method of claim 16 wherein said aqueous, less-saline solution has a salinity between 10 to 20 percent of that of said aqueous, saline solution of surfactant.

18. The method of claim 16 wherein said aqueous, less-saline solution is fresh water.

19. The method of claim 1 wherein said aqueous, less-saline solution containing said low molecular weight component of said surfactant has a salinity less than one-half that of said aqueous, saline solution of surfactant.

20. The method of claim 1 wherein a solution of thickening agent is injected through said injection well and into said subterranean formation after said aqueous, less-saline solution of said low molecular weight component of said surfactant.

21. The method of claim 20 wherein said solution of thickening agent contains polysaccharide B-1459, the heteropolysaccharide produced by bacterium *Xanthomonas campestris* NRRL B-1459, United States Department of Agriculture, from commercial glucose in a fermenting operation.

22. The method of claim 20 wherein said solution of thickening agent contains thickening agent in a concentration of from about 0.005 to about 2 percent by weight.

23. The method of claim 22 wherein said thickening agent is in a concentration of from about 0.01 to about 0.3 percent by weight.

24. The method of claim 23 wherein said thickening agent is in a concentration of from about 0.03 to about 0.1 percent by weight.

25. The method of claim 20 wherein said solution of thickening agent contains from about 0.0002 to about 0.5 percent by weight of bactericide.

26. The method of claim 20 wherein the first portion of said solution has a viscosity approximately equal to that of said oil and a succeeding portion has a lower viscosity.

27. The method of claim 26 wherein said solution of thickening agent has a linearly decreasing concentration of thickening agent such that the viscosity of said solution decreases from approximately that of said oil down to that approximately equal to said flooding water.

28. The method of claim 1 wherein a slug of from about 0.01 to about 0.2 pore volume, inclusive, of aqueous buffer liquid containing less than 2 percent by weight if sodium chloride and essentially no divalent cations is injected through said injection well and into said subterranean formation ahead of said aqueous solution of sacrificial inorganic additive.

29. The method of claim 1 wherein a slug of from about 0.01 to about 0.2 pore volume, inclusive, of aqueous buffer liquid containing less than 2 percent by weight of sodium chloride and essentially no divalent cations is injected through said injection well and into said subterranean formation behind said aqueous, less-saline solution of said low molecular weight component of said surfactant and in front of said flooding water.

30. The method of claim 1 wherein said aqueous, less-saline solution contains from about 0.0002 to about 0.03 percent by weight of said low molecular weight component of said surfactant.

31. A method of recovering oil from an oil-containing subterranean formation having injection means and production means which comprises the steps of:

(a) injecting through an injection well and into said subterranean formation a solution of sacrificial inorganic additive containing enough sacrificial inorganic additive to cover a majority of the adsorption sites of said subterranean formation, (b) injecting through said injection well and into said subterranean formation an aqueous buffer liquid of from about 0.01 pore volume to about 0.1 pore volume and containing a concentration of from about 0.05 to about 0.2 percent by weight of said sacrificial inorganic additive, (c) injecting through said injection well and into said subterranean formation an aqueous, saline solution containing a mixture of petroleum sulfonates having a median molecular weight of from about 375 to about 430, having molecular weights between 290 and 590, no more than 10 percent by weight having an average molecular weight less than 290 and no more than 15 percent by weight having an average molecular weight of 590 in a concentration sufficient to effect an interfacial tension less than 0.1 dyne per centimeter with said oil, and containing a concentration of said sacrificial inorganic additive between 0.05 percent and 0.2 percent by weight sufficient to reduce adsorption of said surfactant onto said subterranean formation, (d) injecting through said injection well and into said subterranean formation an aqueous, less-saline solution containing from about 0.0002 to about 0.03 percent by weight of low molecular weight petroleum sulfonates having a median molecular weight of from about 340 to about 380 and having molecular weights as low as 290, and containing from 0.05 to 0.2 percent by weight, and sufficient to reduce the adsorption of said petroleum sulfonate surfactant, of said sacrificial inorganic additive, said aqueous, less-saline solution having a lesser salinity than that of the preceding aqueous, saline solution of said petroleum sulfonates.

(e) injecting through said injection well and into said subterranean formation a solution of a thickening agent in a concentration sufficient to impart a viscosity to said solution to about that of said oil and a bactericide, (f) injecting through said injection well and into said subterranean formation a solution of thickening agent containing a lower concentration of said thickening agent providing at least one solution having a viscosity intermediate between that of said oil and flooding water subsequently injected through said injection well and into said formation, (g) injecting through said injection well and into said subterranean formation flooding water, and (h) producing oil from said subterranean formation through a production well to the surface of the earth.

32. The method of claim 31 wherein said sacrificial inorganic additive is sodium carbonate and an inorganic polyphosphate.

33. The method of claim 32 wherein said inorganic polyphosphate is sodium tripolyphosphate or tetrasodium pyrophosphate.

34. The method of claim 31 wherein solution of sacrificial inorganic additive of step (a) contains enough sacrificial inorganic additive to saturate said adsorption sites of said subterranean formation.

35. The method of claim 31 wherein said mixture of petroleum sulfonates comprises a mixture of high molecular weight petroleum sulfonates having a median molecular weight of from about 410 to about 450, and having molecular weights up to 590, and of low molecular weight petroleum sulfonates having a median molecular weight of from about 340 to about 380, and having molecular weights down to 290.

36. The method of claim 35 wherein said high molecular weight petroleum sulfonates have a median molecular weight of about 418 and said low molecular weight petroleum sulfonates have a median molecular weight of about 346.

37. The method of claim 31 wherein said mixture of petroleum sulfonates is dissolved or dispersed in fresh water before added to saline water to form said aqueous, saline solution of surfactant.

38. The method of claim 31 wherein said thickening agent is polysaccharide B–1459, the heteropolysaccharide produced by bacterium *Xanthomonas campestris* NRRL B–1459, United States Department of Agriculture, from glucose.

References Cited

UNITED STATES PATENTS

| | | | |
|---|---|---|---|
| 2,731,414 | 1/1956 | Binder et al. | 166—10 X |
| 3,025,911 | 3/1962 | Bergman | 166—9 X |
| 3,126,952 | 3/1964 | Jones | 166—9 |
| 3,191,676 | 6/1965 | Froning | 166—9 |
| 3,208,518 | 9/1965 | Patton | 166—9 |
| 3,258,071 | 6/1966 | Yu Shen et al. | 166—9 |
| 3,288,213 | 11/1966 | King et al. | 166—9 |
| 3,302,713 | 2/1967 | Ahearn et al. | 166—9 |
| 3,348,611 | 10/1967 | Reisberg | 166—9 |
| 3,361,313 | 1/1968 | Riggs et al. | 166—9 X |
| 3,369,602 | 2/1968 | Fallgatter et al. | 166—9 |

STEPHEN J. NOVOSAD, *Primary Examiner.*

UNITED STATES PATENT OFFICE
CERTIFICATE OF CORRECTION

Patent No. 3,437,141

April 8, 1969

Carl F. Brandner et al.

It is certified that error appears in the above identified patent and that said Letters Patent are hereby corrected as shown below:

Column 3, line 39, "DRAWINGS" should read -- DRAWING --; line 41, "crosssectionally" should read -- cross sectionally --; line 64, "$Na_2B_4O^7 \cdot 10\ H_2O$." should read -- $Na_2B_4O_7 \cdot 10\ H_2O$. --. Column 4, line 66, "concentartion" should read -- concentration --; line 73, "percent by weight)" should read -- (percent by weight) --. Column 5, lines 9 and 23, "carboante", each occurrence, should read -- carbonate --. Column 6, line 7, "roleum" should read -- troleum --; line 63, "aqeous" should read -- aqueous --. Column 7, line 4, "fromt" should read -- from --; line 5, "volues" should read -- volumes --; line 52, "Specificially" should read -- Specifically --. Column 8, line 68, "avil-" should read -- avail- --. Column 12, line 56, "0.1" should read -- 0.01 --. Column 13, line 55, "if" should read -- of --.

Signed and sealed this 7th day of April 1970.

(SEAL)
Attest:

EDWARD M. FLETCHER, JR.
Attesting Officer

WILLIAM E. SCHUYLER, JR.
Commissioner of Patents